United States Patent [19]
Chang et al.

[11] Patent Number: 5,889,637
[45] Date of Patent: Mar. 30, 1999

[54] AIR BEARING MAGNETIC HEAD SLIDER

[75] Inventors: Ciuter Chang, Fremont; Yiao-Tee Hsia, Pleasanton; Mark J. Donovan; Pablo G. Levi, both of San Jose, all of Calif.

[73] Assignee: Read-Rite Corporation, Milpitas, Calif.

[21] Appl. No.: 995,040

[22] Filed: Oct. 30, 1997

Related U.S. Application Data

[63] Continuation of Ser. No. 754,001, Nov. 21, 1996, abandoned.
[51] Int. Cl.$^6$ ............................... G11B 5/60; G11B 21/21
[52] U.S. Cl. .............................................................. 360/103
[58] Field of Search ............................................. 360/103

[56] References Cited

U.S. PATENT DOCUMENTS 5,550,692  8/1996  Crane ...................... 360/103

Primary Examiner—Robert S. Tupper
Attorney, Agent, or Firm—Nathan N. Kallman

[57] ABSTRACT

An air bearing slider is designed with two rails and a central pad that provide positive air bearing regions to the air bearing surface of the slider, and three recess regions that are etched to a constant depth. The rails are identical and are symmetrically disposed relative to a central longitudinal axis. Each rail includes three sections: a pitch adjustment pad, a leg, and a roll adjustment pad. The pitch adjustment pad provides a balanced pressure distribution at the leading edge and optimizes the overall pitch angle of the slider. The leg extends from the pitch adjustment pad and generates counter-pressure that partially opposes the load applied by the suspension. The roll adjustment pad extends from the leg and generates an air bearing force that compensates for roll generated during slider operation. This air bearing slider design achieves constant flying height and less vertical and pitch stiffness, which will result in low contact force for pseudo-contact applications.

4 Claims, 3 Drawing Sheets

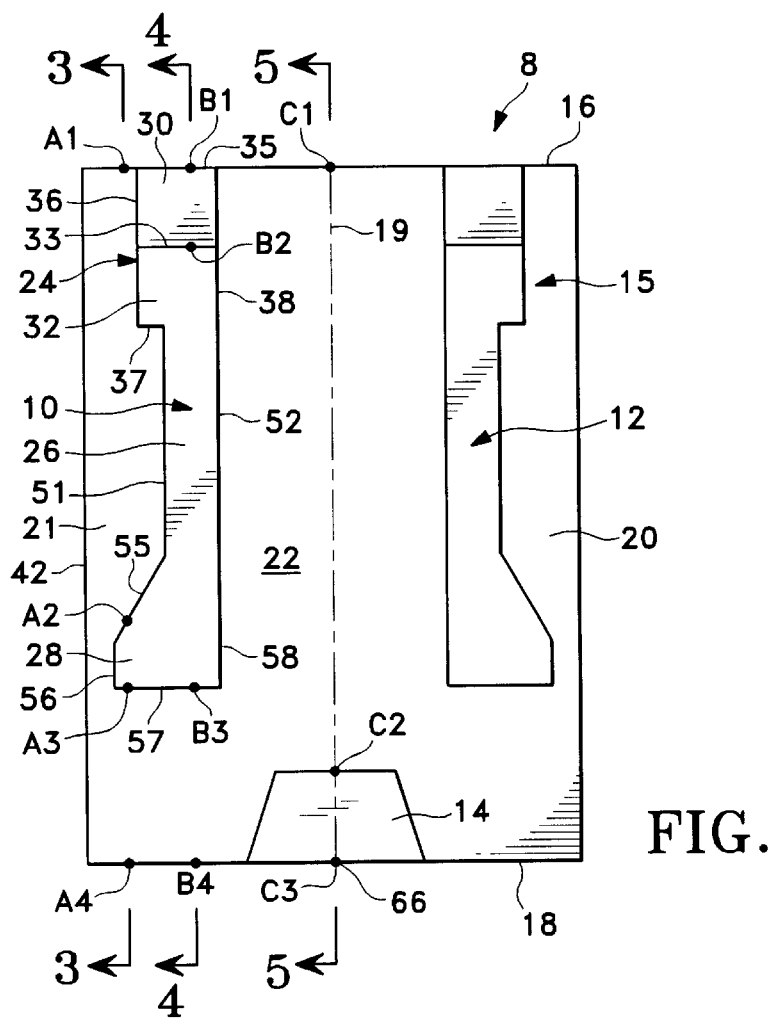
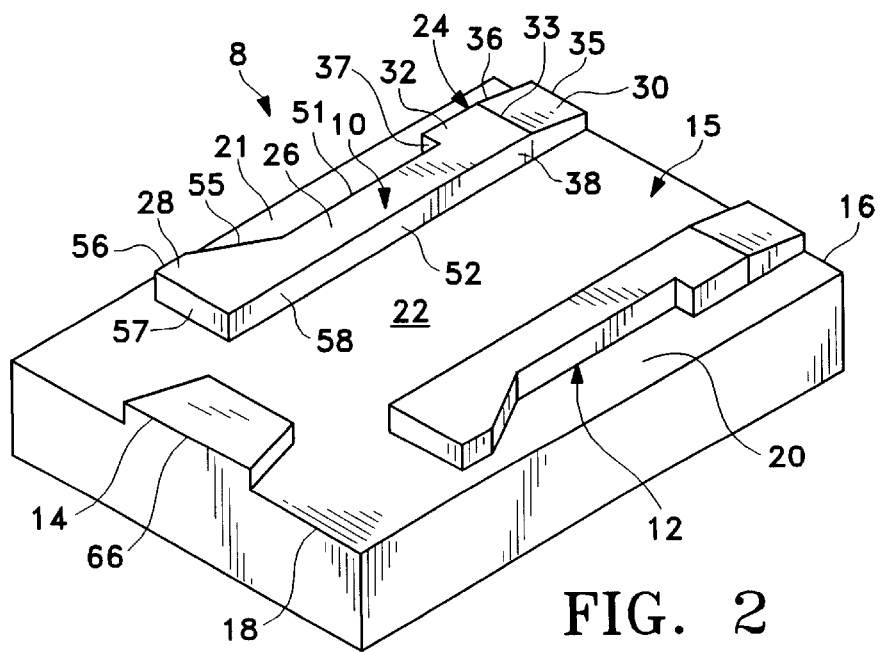
FIG. 1
FIG. 2

AIR BEARING MAGNETIC HEAD SLIDER

This application is a continuation of application Ser. No. 08/754,001, filed Nov. 21, 1996, now abandoned.

CROSS-REFERENCE TO COPENDING PATENT APPLICATION

In the patent application Ser. No. 08/735,043 filed on Oct. 22, 1996, which is a continuation-in-part of parent application Ser. No. 08/574,303 filed Dec. 10, 1995, FIG. 3 illustrates a negative pressure subambient air bearing slider. The present invention discloses a high compliance air bearing magnetic head slider used for contact or pseudo-contact recording wherein a pitch adjustment pad for providing a balanced pressure distribution at the leading edge of the slider so that the slider flies at near constant height for all radius and skew combinations.

FIELD OF THE INVENTION

This invention relates to thin film magnetic heads and in particular to an air bearing slider for use in disk drives that require constant flying height and low stiffness characteristics.

DESCRIPTION OF THE PRIOR ART

Magnetic head assemblies that fly relative to rotating magnetic disks are used extensively in disk drives for recording and reading data. One objective when using a flying head on which at least one magnetic transducer is deposited in a transducing relationship with a magnetic recording disk is to obtain a very close spacing between the transducer and the disk surface. By maintaining a close spacing, it is possible to record short wavelength or high frequency signals thereby realizing high density and high storage capacity data recording.

Air bearing sliders used in disk drives typically have a leading edge and a trailing edge at which thin film transducers are deposited. Typically, the sliders have tapered portions at the leading edge and longitudinal rails that extend from the tapers to the trailing edge. The tapers may be shaped and of such length as to provide fast pressure buildup during takeoff of the slider from a rest position to flying attitudes relative to the disk. The dimensions and shapes of the tapers and rails are instrumental in determining the flying characteristics of the head. The rail design determines the pressure generated at the air bearing surface of the slider. In effect, the pressure distribution underneath the slider determines the flying characteristics, including flying height and pitch and roll of the head relative to a rotating magnetic disk.

A problem with flying the slider close to the disk surface, as is the case with pseudo-contact air bearing sliders, is that in the event of a variation in the slider flying height, the increased interference between the slider and the disk will cause wear, resulting in long term reliability problems which eventually will lead to head crashes. Existing pseudo-contact air bearing sliders may exhibit either large interference between the slider and the disk and/or high air bearing stiffness values that can result in high contact forces.

It is therefore highly desirable to fly the slider at a substantially constant flying height close to the disk surface, while simultaneously minimizing the air bearing stiffness characteristics that can adversely affect drive reliability.

SUMMARY OF THE INVENTION

An object of this invention is to provide a new single etch depth air bearing slider for a pseudo-contact slider that realizes a substantially constant flying height under conditions of changing velocity and skew angle.

Another object is to provide an air bearing slider that provides low stiffness that results in a low contact force and that presents minimal wear and reliability problems.

According to this invention, the air bearing surface of an air bearing slider is designed with rails and a central pad that provide positive air bearing regions. Three recess regions are etched to a constant depth to delineate the desired air bearing pattern of the present invention. The rails are identical and are symmetrically disposed relative to a central longitudinal axis.

Each rail includes three sections: a pitch adjustment pad, a leg, and a roll adjustment pad. The pitch adjustment pad provides a balanced pressure distribution at the leading edge, and optimizes the overall pitch angle of the slider. The leg extends from the pitch adjustment pad and generates counter pressure that partially balances the load applied by the suspension. The roll adjustment pad extends from the leg and generates an air bearing force that compensates for at least part of the roll generated during flight.

BRIEF DESCRIPTION OF THE DRAWING

The invention will be described in greater detail with reference to the drawing in which:

FIG. 1 is a plan view depicting an air bearing surface of a slider configured in accordance with this invention;

FIG. 2 is an isometric view of the slider of FIG. 1;

Similar numerals refer to similar elements in the drawing. It should be understood that the sizes of the different components in the figures are not necessarily to scale and are shown for visual clarity and for the purpose of explanation.

DETAILED DESCRIPTION OF THE INVENTION

Figure 3:
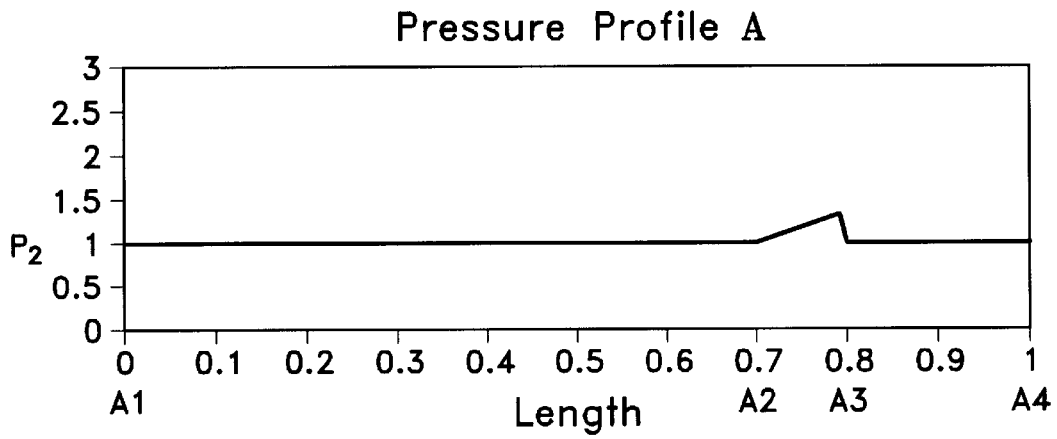
FIG. 3 represents a pressure profile "A" corresponding to section 3—3 along the slider air bearing surface of FIG. 1.

With reference to FIG. 1, an air bearing slider 8 is formed of two rails 10, 12 and a central pad 14 that provide the positive air bearing regions to the air bearing surface 15 of the slider 8. Etching is done using available techniques such as ion milling or reactive ion etching, and defines the geometry of the rails 10, 12 and the central pad 14. The pattern of the rails 10, 12, the central pad 14, and the recess regions 20, 21, 22 minimizes sub-ambient pressure over the entire air bearing surface 15, which enhances the overall compliance of the slider 8.

The slider 8 has a leading edge 16 and a trailing edge 18, and the air bearing surface 15 is typically rectangularly shaped. The nano-sized slider 8 is about 0.080 inch long; about 0.063 inch wide; and about 0.017 inch high. Three recess regions 20, 21, 22 are etched to a constant depth of approximately 200 micro-inches. The rails 10, 12 are identical and are symmetrically disposed relative to the central longitudinal axis 19 of the slider 8. Therefore, only one rail, for example rail 10, will be described in detail.

The rail 10 comprises three sections: a pitch adjustment pad 24; a leg 26; and a roll adjustment pad 28. The pitch adjustment pad 24 provides a balanced pressure distribution at the leading edge 16, and optimizes the overall pitch angle of the slider 8, thus optimizing its stability while flying over the magnetic medium. The pitch adjustment pad 24 is formed with a leading edge taper 30 to enable fast takeoff of the slider 8 from its rest position; and a front pad 32. The taper 30 interfaces with the front pad 32 along side 33, and can form an obtuse angle with the front pad 32. Alternatively, the taper 30 can be formed as a single shallow etch step.

The pitch adjustment pad 24 has a width of about 10 milli-inches (mils) and a length of about 16 mils, and is outlined by four straight sides 35, 36, 37, 38. In this particular example, the leading side 35 is collinear with the leading edge 16, and is approximately 10 mils wide. In another embodiment the leading side 35 can be offset relative to the leading edge 16. The outer side 36 is approximately 16 mils long, and is parallel to, and at a distance of about 10 mils from the side 42 of the slider 8. It should be understood that in another embodiment, the outer side 36 may be in closer proximity, and angularly disposed relative to the slider side 42. The short side 37 is approximately 2 mils wide, and does not extend throughout the entire width of the rail 10. Side 37 can be parallel to the leading side 35.

Leg 26 extends the front pad 32 towards the trailing edge 18, and generates counter pressure that partially balances the load applied by the suspension (not shown). The leg 26 is outlined in part by an outer side 51 and an inner side 52.

In the present illustration the air bearing surface of the leg 26 is polygon shaped, and the outer side 51 and the inner side 52 are parallel. The outer side 51 is parallel to the side 42 of the slider 8, and at a distance of about 12 mils therefrom. It should be understood that in another embodiment the outer side 51 may be in closer proximity to the side 42. In yet another embodiment the outer side 51 may be at an angle relative to the side 42 without disrupting the overall balanced pressure distribution of the slider 8.

In the preferred embodiment the inner side 52 extends from, and is collinear with the inner side 38 of the pitch adjustment pad 24. In another embodiment, the inner side 52 may be slightly arcuately shaped, or alternatively it may be etched at an angle relative to inner side 38, while still minimizing the generation of negative pressure and maintaining an open air flow architecture between the two rails 10, 12.

The roll adjustment pad 28 extends from the leg 26 towards the trailing edge 18, and generates an air bearing force that compensates for at least part of the roll generated during flight. The roll adjustment pad 28 is outlined in part by two outer sides 55, 56, a trailing side 57, and an inner side 58.

In the present illustration the air bearing surface of the roll adjustment pad 28 is polygon-shaped. The outer side 56 is parallel to the inner side 58, and the trailing side 57 is parallel to the leading side 35. The outer side 55 is etched at an angle of approximately 45°, relative to the outer side 51 of the leg 26. The outer side 55 is approximately 15 mils long. It should be understood that in another embodiment, the outer side 55 may be longer, or at a different angle relative to the outer side 51.

The outer side 56 is etched in close proximity to the side 42 of the slider 8, for instance 2 mils. The trailing side 57 is approximately 18 mils wide, and is etched at a distance of approximately 19 mils from the trailing edge 18. In the preferred embodiment, the inner side 58 extends from, and is collinear with the inner side 52 of the leg 26 and the inner side 38 of the pitch adjustment pad 24. In another embodiment the inner side 58 may be slightly arcuately shaped, or alternatively it can be positioned at an angle relative to inner side 52, while still minimizing the generation of negative pressure, and maintaining an open air flow between the rails 10, 12.

The central pad 14 is trapezoidally or wedge shaped and is provided at the trailing edge substantially centrally relative to the longitudinal axis 19 of the slider 8. A thin film transducer 66 is deposited at the trailing edge of the slider 8.

The recess regions 20 and 21 are functionally identical, and are symmetrical relative to the slider longitudinal axis 19. Therefore, only the recess region 21 will be described. The recess region 21 is defined by the rail 10 and the side 42 of the slider 8, and cooperates with the roll adjustment pad 28 to balance the roll action of the slider 8.

The recess region 22 is defined by the inner sides of the two rails 10, 12, and provides a continuous and unobstructed open channel for the air flow across the air bearing surface 15. This open channel assists in optimizing the compliance of the slider 8, as well as in maintaining a substantially constant flying height across the disk surface.

FIG. 3 illustrates a pressure profile "A" corresponding to section 3—3 along the air bearing surface 15 of the slider 8. In this profile, pressure is normalized relative to the ambient pressure, and is plotted against the length of the slider 8. Pressure profile "A" starts at ambient pressure, at point A1 on the leading edge 16, and begins to increase gradually from point A2 on the outer side 55 to point A3 on the trailing side 57. At point A3 the pressure drops sharply to just below ambient pressure, and then gradually increases to ambient pressure at point A4 at the trailing edge 18.

Figure 4:
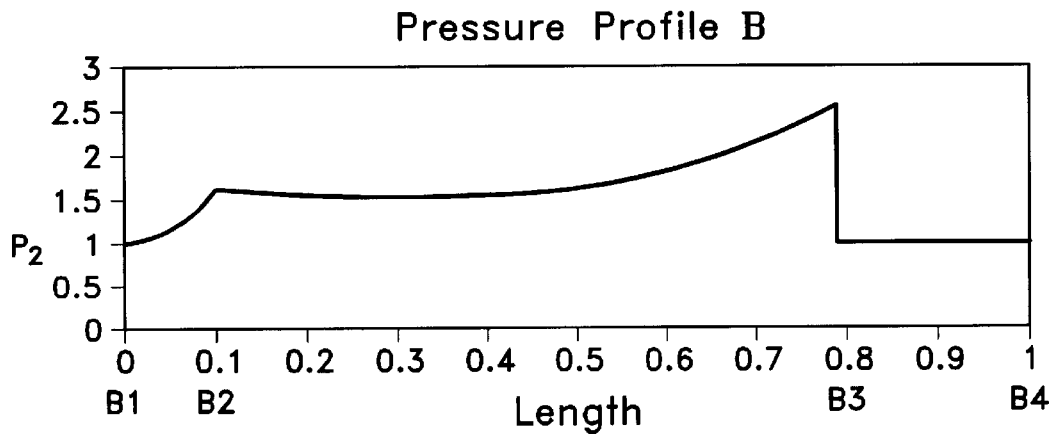
FIG. 4 illustrates a pressure profile "B" corresponding to section 4—4 along the slider air bearing surface of FIG. 1.

FIG. 4 illustrates a pressure profile "B" corresponding to section 4—4 along the air bearing surface 15 of the slider 8. Pressure profile "B" starts at the ambient pressure, at point B1 at the leading edge 16, and begins to increase gradually from point B2 on the interface side 33 to point B3 on the trailing side 57. At point B3, the pressure drops sharply to just below ambient pressure and then gradually increases to ambient pressure at point B4 at the trailing edge 18.

Figure 5:
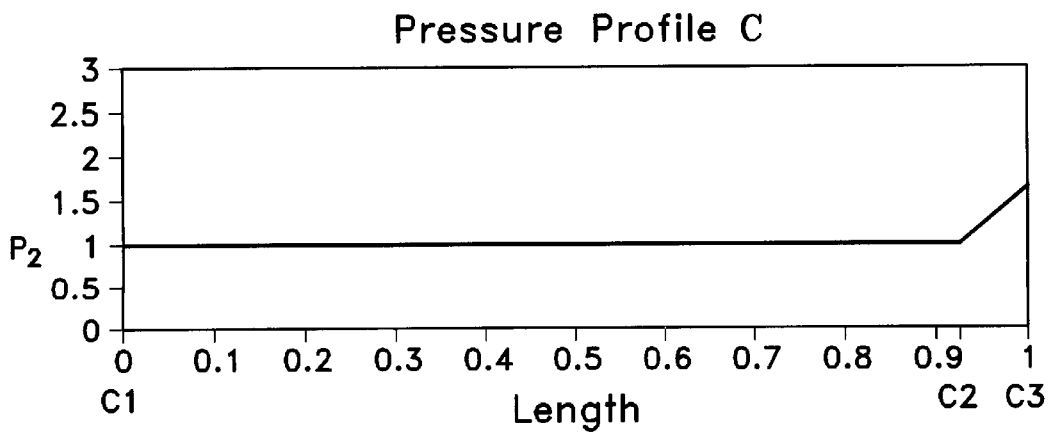
FIG. 5 illustrates a pressure profile "C" corresponding to section 5—5 along the slider air bearing surface of FIG. 1.

FIG. 5 illustrates a pressure profile "C" corresponding to section 5—5, within the cental recess region 22. Pressure profile "C" starts at ambient pressure, at point C1 at the leading edge 16, and is maintained at this pressure to point C2 on the central pad 14. At point C2, pressure begins to increase gradually to point C3 near the trailing edge 18, and then drops sharply to ambient pressure at point C4.

Figure 6:
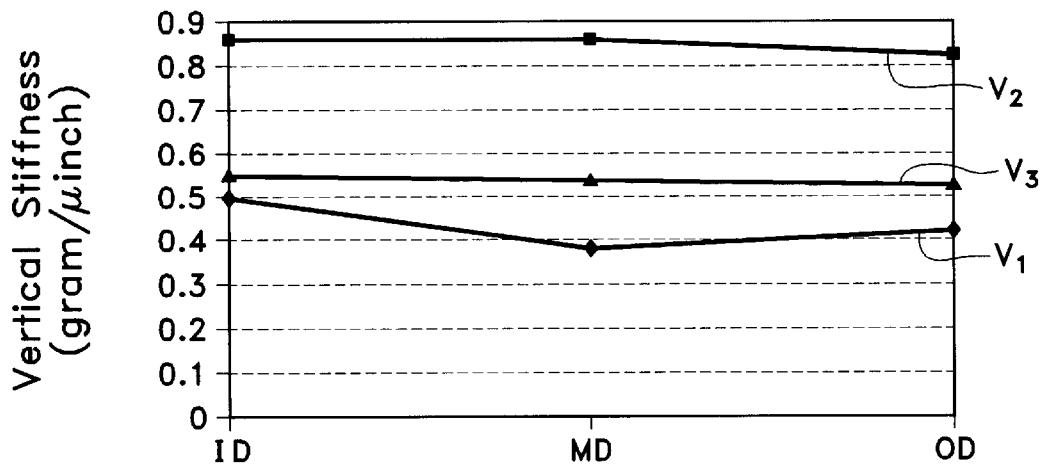
FIG. 6 illustrates three curves plotting vertical stiffness versus disk radius for the slider of FIG. 1 and for two conventional sliders.
Figure 7:
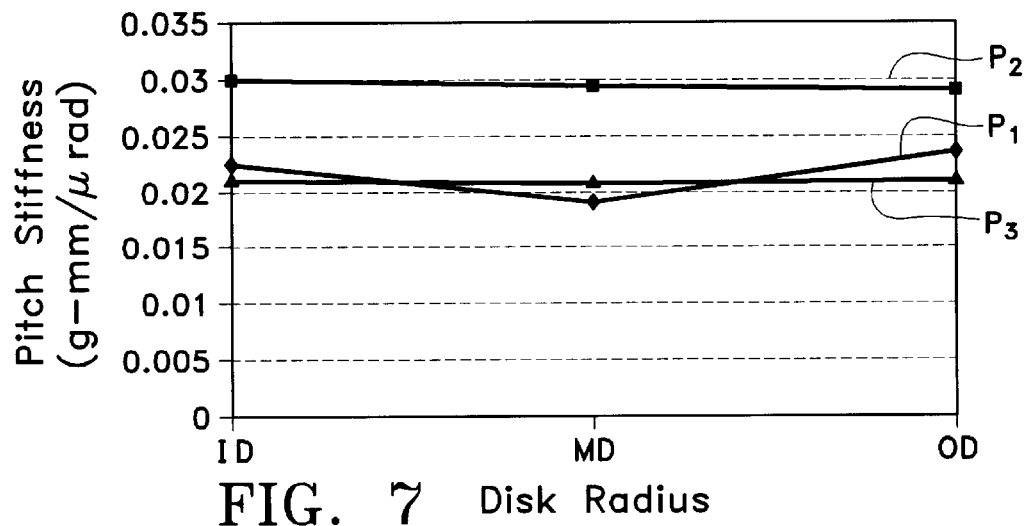
FIG. 7 illustrates three curves plotting pitch stiffness versus disk radius for the slider of FIG. 1 and for two conventional sliders.
Figure 8:
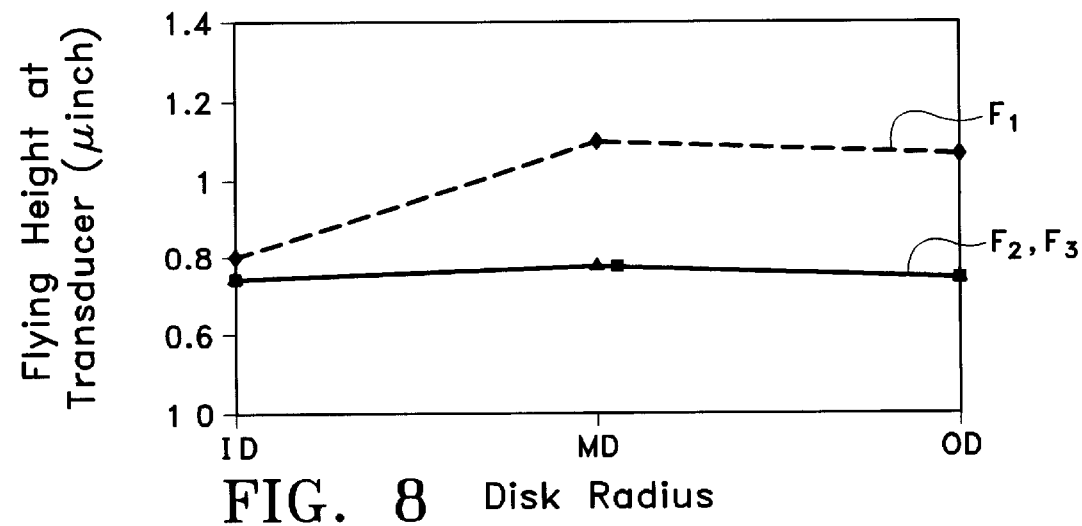
FIG. 8 illustrates three curves plotting the flying height at the transducer versus the disk radius for the slider of FIG. 1 and for two conventional sliders.

FIG. 6 illustrates three curves V1, V2, V3 that respectively plot the vertical stiffness (in grams per micro-inch) relative to the disk radius of the magnetic disk, for two conventional sliders (curves V1 and V2) and the slider 8 of the present invention (curve V3). FIG. 7 represents three curves P1, P2, P3 that respectively plot pitch stiffness (in grams.mm/$\mu$rad) per micro-inch) relative to the disk radius of the magnetic disk, for two conventional sliders (curves P1 and P2) and the slider 8 of the present invention (curve P3). FIG. 8 illustrates three curves F1, F2, F3 that respectively plot the flying height at the transducer versus the disk radius for two conventional sliders (curves F1 and F2) and the slider 8 of the present invention (curve F3). In these figures, "ID", "MD" and "OD" refer to the inner diameter, middle diameter, and outer diameter, respectively, of the magnetic medium. Considering curves V1, P1 and F1, they correspond to a first conventional slider, and show that this conventional slider has low vertical stiffness (curve V1), low pitch stiffness (curve P1), and a non-constant flying height (curve F1). The magnitude of the contact force between the slider and the magnetic medium is largely determined by the stiffness of the air bearing. Thus, this conventional slider also exhibits low contact force because of its low stiffness. One drawback of this conventional slider is its inability to achieve a constant flying height across the magnetic medium for all radius and skew combinations. For example, for a 95 millimeter (mm) disk, the flying height at the inner diameter "ID" is typically between 0.3 and 0.5 micro-inch lower than the flying height at the outer diameter "OD". For pseudo-contact recording applications, if the design were optimized for the flying height at the outer diameter "OD", then a large amount of interference is generated at the inner diameter "ID", which decreases the head reliability.

Considering curves V2, P2 and F2, they correspond to a second conventional slider, and show that this conventional slider has high vertical stiffness (curve V2), high pitch stiffness (curve P2), and a constant flying height (curve F2). This slider achieves a constant flying height by generating subambient pressure that helps compensate for the velocity and skew changes underneath the slider. The drawback of this slider, however, is that subambient pressure leads to higher air bearing stiffness. As a result, for a given interference, the contact force could be greater than twice that generated by the first conventional slider.

Considering curves V3, P3 and F3 they correspond to the slider 8 of the present invention, and show that the slider 8 has low vertical stiffness (curve V3), low pitch stiffness (curve P3), and maintains a constant flying height (curve F3). It is therefore clear that the design of the slider 8 improves the overall head reliability.

It should be understood that the geometry, dimensions and parameters described above may be modified within the scope of the invention. For example, the widths and lengths of the rails may be modified depending upon the disk drive operating characteristics. Also the etch depths of the recesses may differ for different applications. The rails may have rounded, arcuate or angled corners instead of being rectangular with 90 degree corners. Other modifications may be made when implementing the invention for a particular environment. Further, while the invention has been described in relation to a nano-sized slider, it should be understood that the present concept may be applied to other sliders of different sizes.

What is claimed is:

1. A thin film magnetic head assembly including a head suspension for contact or pseudo-contact recording with a rotary magnetic disk comprising:

an air bearing slider mounted to said head suspension and having an air bearing surface and leading and trailing edges with substantially parallel first and second sides extending from said leading edge to said trailing edge, said slider having a central longitudinal axis between said edges and parallel to said sides;

said air bearing surface configured with first and second rails symmetrically formed on said air bearing surface of said slider relative to said central longitudinal axis, and disposed at a distance from said first and second sides of said slider to define first and second recess regions, said first and second rails extending from said leading edge only partially towards said trailing edge, and being spaced apart to define a third recess region therebetween;

wherein each of said first and second rails includes a rectangular pitch adjustment pad, said pitch adjustment pad including a leading edge taper and a front pad, said front pad and said taper having connected collinear inner sides and connected collinear outer sides that are parallel to said central axis, said pitch adjustment pad providing a balanced pressure distribution at said leading edge to control the pitch angle of said slider;

a polygon shaped roll adjustment pad for compensating for roll of said slider; and a narrowed rectangular leg portion disposed between the trailing end of said front pad and the leading end of said roll adjustment pad, said leg portion being of greater length than either of said pads for balancing the load applied by said head suspension to said slider;

said pitch adjustment pad, said roll adjustment pad, and said narrowed leg portion, all having connecting inner sides facing said central longitudinal axis, said inner sides being collinear and joined in parallel relation to said central axis;

said pitch adjustment pad, said narrowed leg portion, and said roll adjustment pad, each having outer sides that are parallel to said central axis;

said roll adjustment pad having an outer angular side diverging from the outer side of said leg portion; and a trapezoidal shaped central pad disposed at said trailing edge of said slider;

so that a substantially constant flying height of said slider is maintained under conditions of changing disk velocity and skew angle with low contact force and minimum interference between said magnetic head assembly and said magnetic disk.

2. A thin film magnetic head according to claim 1, wherein said first, second and third recess regions are etched to a depth ranging from approximately 100 micro-inches to approximately 300 micro-inches.

3. A thin film magnetic head according to claim 1, wherein said roll adjustment pad of each roll is etched in close proximity to a respective side of said slider; and wherein said trailing side of said roll adjustment pad is formed at a distance from said trailing edge of said slider.

4. A thin film magnetic head according to claim 3, wherein said inner side of said roll adjustment pad extends from said inner side of said leg and said inner side of said pitch adjustment pad for minimizing the generation of negative pressure, and for maintaining an open air flow between said first and second rails.

* * * * *